Figure 1:
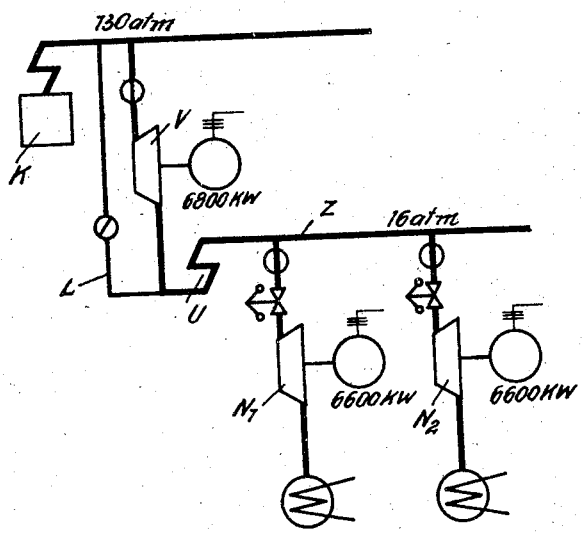

Sept. 2, 1941.                H. GLEICHMANN                2,254,424
                              STEAM POWER PLANT
                              Filed Feb. 7, 1938              3 Sheets—Sheet 1

Inventor
Hans Gleichmann
by Knight Bros
Attorneys

Sept. 2, 1941. H. GLEICHMANN 2,254,424
STEAM POWER PLANT
Filed Feb. 7, 1938 3 Sheets-Sheet 2

Inventor
Hans Gleichmann
by Knight Bros.
Attorneys

Sept. 2, 1941.  H. GLEICHMANN  2,254,424
STEAM POWER PLANT
Filed Feb. 7, 1938  3 Sheets-Sheet 3
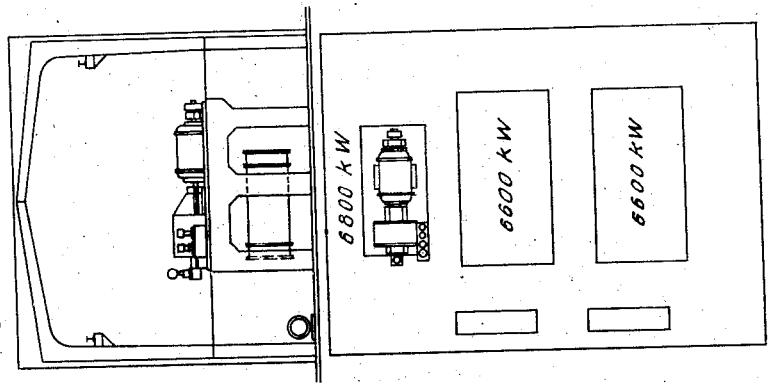
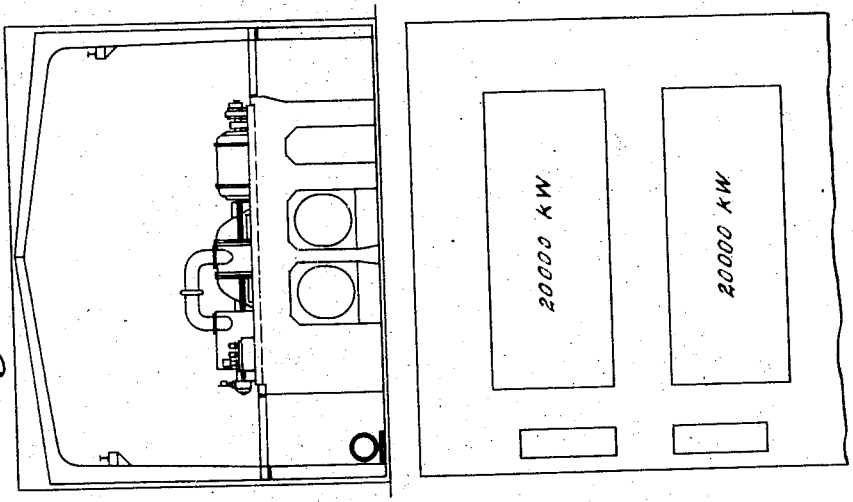

Patented Sept. 2, 1941

2,254,424

UNITED STATES PATENT OFFICE 2,254,424

STEAM POWER PLANT

Hans Gleichmann, Falkenhain, Kreis Ost-Havelland, Germany, assignor to Siemens-Schuckertwerke Aktiengesellschaft, Berlin-Siemensstadt, Germany, a corporation of Germany Application February 7, 1938, Serial No. 189,059
In Germany December 31, 1936

4 Claims. (Cl. 60—70)

This invention relates to improvements in steam power plants.

By reason of the fact that, apart from economy, the necessity of ensuring an absolutely reliable supply of energy is a basic requirement which must be met in steam power plants, particular attention is devoted, when installing a steam power plant, to the question of ensuring the availability of auxiliary energy in the event of energy shortage owing to damage to machinery. In practically all steam power plants of the larger type therefore a stand-by engine is provided in addition to the normal operating engines so that in the event of failure of a normal operating engine the stand-by engine compensates for the shortage of power.

In the following, a fundamentally new method of rendering energy available in cases of shortage owing to damage to machinery will be described, this method being applicable to cases, which are today of increasing importance, where the steam power plant is of the high-pressure type.

The invention is characterized by the combination of the following features:

(a) The shortage of power is compensated for by the remaining normal operating engines, that is to say without the aid of stand-by engines.

(b) The engine plant is divided into a superposed high-pressure engine and two low-pressure engines operating in parallel.

(c) The intermediate pressure between the high-pressure engine and the low-pressure engines is variable to such an extent that upon failure of a low-pressure engine, or of the superposed high-pressure engine, the shortage of power, or in any event, a large portion thereof may be compensated for by the low-pressure engine or engines remaining in operation.

It will be understood that the measures required in a high-pressure plant, for example intermediate superheating, must also be taken in the case of plants according to the invention, and these measures will therefore not be separately dealt with.

The conditions arising in the practical application of the invention will be explained in the following. For the sake of clearness in description, specific values will be used, by way of example, in the calculations, and it will be assumed that the power plant has to deliver 20,000 kw., and that it is desired to install the smallest number of kva., the calculations being carried out with a cos.α=0.85.

On the basis of the views hitherto held concerning the construction of such a plant, it would be necessary to install in addition to a normally operating engine set of 20,000 kw., a second 20,000 kw., set as a stand-by, so that the output would amount to 40,000 kw. or 50,000 kva. with cos.α=0.8. It is unnecessary here to discuss the use of three 10,000 kw. sets instead of two 20,000 kw. sets, since the use of such engines for high-pressure plants would not be practicable.

In a plant according to the invention, the distribution of the engines within the set is differently effected, in that a superposed high-pressure engine of 6,800 kw. and two low-pressure engines each of 6,600 kw. working in parallel are installed, these engines producing together 20,000 kw., provided that a certain intermediate pressure is maintained. The example is calculated for an initial pressure of 130 absolute atmospheres and an intermediate pressure of 16 absolute atmospheres. However, these engines are so constructed that they can produce higher powers if the intermediate pressure be increased, the superposed high-pressure engine group being constructed for 8,000 kva. and each of the two low-pressure engines for 12,500 kva. output. This results in a total kva. output of 33,000 as compared with 40,000 kva. in the case of plants with a stand-by set of the same output as the normal operating set hitherto known.

My invention is diagrammatically illustrated in the accompanying drawings, in which—

Figure 2:
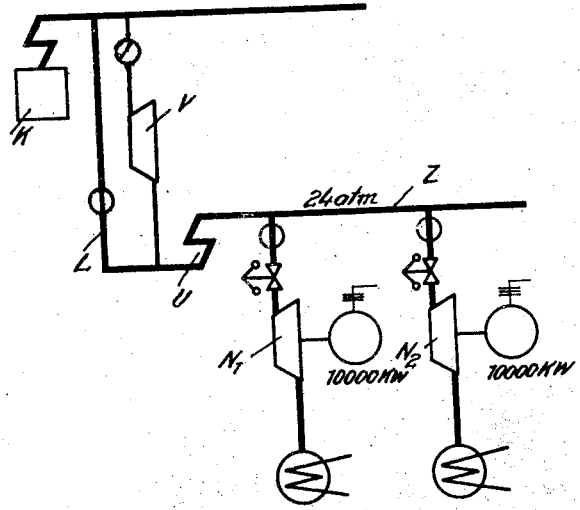
Figure 3:
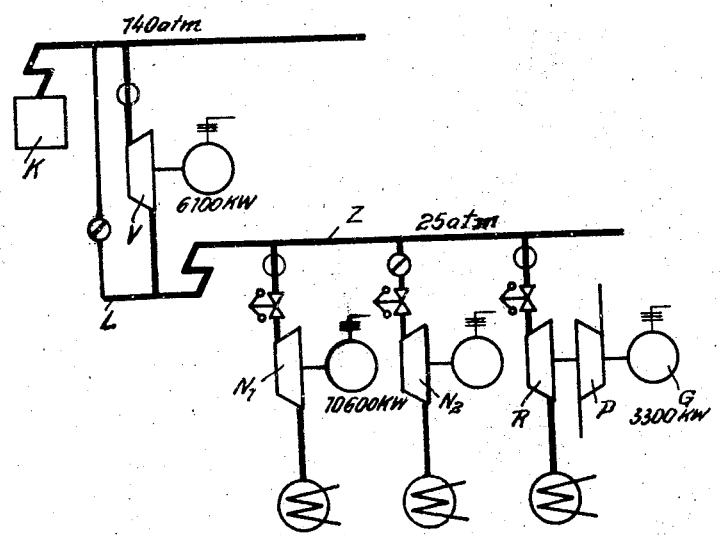
Figure 4:
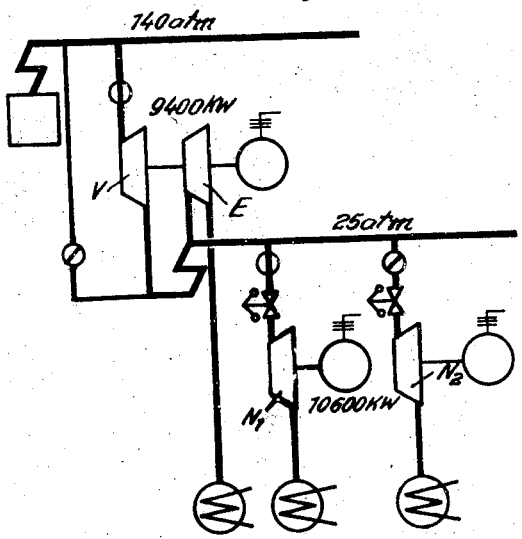

Figs. 1 and 2 show one form and Figs. 3 and 4 show two other forms of steam connection between the several normal prime movers of a set to compensate for the failure of one of the different units of the set without the use of an entirely separate stand-by engine.

Figs. 5 and 6 illustrate diagrammatically in elevation and plan view and comparatively the general layout and space requirements of two entire plants, one (Fig. 5) according to the prior art systems and the other (Fig. 6) according to the present invention, and Figs. 7 and 8 illustrate diagrammatically and comparatively the space requirements for the auxiliary pump units in the prior art systems (Fig. 7) and according to the present invention (Fig. 8).

A diagram of the connections for a 33,000 kva. output set is shown in Fig. 1, in which K designates the steam generator, V the superposed high-pressure engine, $N_1$ and $N_2$ the low-pressure engines, Z the intermediate network working at variable pressure, U an intermediate superheater, and L a by-pass pipe leading around the engine V and which in Fig. 1 must be assumed to be normally closed. In this plant, a shortage of energy from any engine can be compensated for by the remaining engines, in some cases completely and in other cases with the exception of a very small residue. Should it also be necessary to compensate for this residue, there are methods of doing this which will be hereinafter described. The flow lines leading to the low pressure engines of the intermediate network each includes a governor controlled valve and a manual valve disposed in series. The same is true of the arrangements illustrated in Figs. 2 to 4.

For instance, in the event of the high-pressure engine V failing, as indicated in Fig. 2 in dotted lines, a direct connection is established between the steam generator K and the intermediate network Z through the pipe L, and the pressure in this intermediate network is increased, for example from 16 atmospheres absolute pressure to 24 atmospheres absolute pressure. Whether the steam generator K is then operated at the increased low pressure, which would readily be possible particularly in the case of a steam generator with forced passage of the operating medium, or whether the normal high steam generator pressure should be throttled down to this level, is a matter which will depend on individual circumstances. In any event, it is necessary that the intermediate pressure Z should be increased. Since the two engines $N_1$ and $N_2$ are rated for 12,500 kva., it is now possible to produce therewith an output of 10,000 kw. each, thus producing a total output of 20,000 kw., so that the failure of the superposed engine will be compensated for without the aid of a stand-by engine.

Fig. 3 illustrates the case in which one of the low-pressure engines, namely the engine $N_2$, fails. The $\cos.\alpha$ still includes a small reserve, so that it is possible to obtain 10,600 kw. from the engine $N_1$, although this entails a small pressure variation. The high-pressure will rise to 140 absolute atmospheres and the intermediate pressure to 25 absolute atmospheres, the total output obtained from these two engines then being 16,700 kw., so that there is a residual shortage of 3,300 kw. Since in this case the breakdown of the engine $N_2$ is assumed to be only temporary the supply of this comparatively small residual power could be dispensed with. However, if importance is attached to the production of 20,000 kw. this may be done in various ways. Fig. 3 shows the case in which one of the normal auxiliary engines of the plant, in this case an auxiliary pump set is employed for this purpose. In the generating station an auxiliary pump set consisting of a turbine and a pump must always be available for feeding the steam generator. In this turbine-pump set the turbine may be rated for the present purpose for a greater output than is absolutely necessary for its normal purpose and an electric current generator may be coupled therewith. There is then available in this auxiliary set a certain surplus of power, which may be utilized in the event of a breakdown of one of the engines $N_1$ or $N_2$. In the diagram of connections shown in Fig. 3, R is the stand-by pump turbine, P the pump and G an additional current generator. The residual power shortage amounts in the foregoing example to 3,300 kw., so that the engine R must be rated for this power. If the pump power consumption be calculated as 800 kw., a supplementary generator power of 2,500 kw. or 3,200 kva. remains, which must be installed as an additional output. If these 3,200 kva. be added to the 33,000 kva. already mentioned, a total installed kva. power of 36,200 kva. is obtained.

Another possible method is shown in the diagram of connections in Fig. 4, in which a further stage E is coupled, as a condensing engine, with the superposed engine V. In this case, the engine unit consisting of the parts V and E would have to furnish a total power of 9,400 kw. if the engine $N_1$ were fully utilized up to the limit of 10,600 kw. in case $N_2$ has broken down. Whether the condensing engine E is caused to furnish constantly a certain amount of power, or whether it is normally caused to run at no load together with the superposed engine V and is employed only in the event of failure of engine power in the low-pressure network is a matter which would depend on individual circumstances. As a rule, it will probably be advantageous to cause the condensing engine to constantly produce a certain amount of power.

When reference is made in the foregoing to a high-pressure engine and two low-pressure engines, this representation of the invention only constitutes a fundamental explanation of the power plant. The conditions are naturally in no way altered if, for example owing to the fact that a larger amount of power must be generated, the number of engines or units in the high-pressure network or in the low-pressure network is increased, because in this case it would be all the easier to compensate the power shortage, according to the invention, without the aid of a separate stand-by engine, by the normal operating engines, that is to say, by varying the intermediate pressure, as shown in Fig. 2.

The advantages of this manner of securing auxiliary energy for steam power plants are structural as well as in the operation. While in the prior art power plants, in case of an engine breakdown, the deficiency in the power output could be covered only by overload provisions for the prime movers, it becomes feasible with the present operating system to build the prime movers without overload provisions but for higher intermediate pressures. Such prime movers thus become simpler in construction and accordingly cheaper and more reliable in operation. So far as the operating advantages are concerned, the deficiency in power can be covered at nearly the normal efficiency of the prime movers. Thus the specific steam consumption is not, or at least not essentially, reduced. Besides, by increasing the intermediate steam pressure in the manner and for the purpose described, the output of the low pressure prime movers can be increased considerably beyond the degree possible with the customary prior art overload arrangements.

The structural advantages of the invention can be seen from a comparison of two entire plant layouts shown in Figs. 5 and 6, Fig. 5 showing the prior art arrangement and Fig. 6 the arrangement according to the present invention, indicating the sizes of the engine units according to Fig. 1 as an example. It is true that comparison of the pump units required for the two plants Fig. 5 and Fig. 6, as indicated in Figs. 7 and 8 respectively, shows a certain increase in the size of the pump unit in the system B according to the invention, but the remaining installation as Figs. 5 and 6 indicate shows a substantial reduction in the size of the engine units and consequently in the space required and in the constructional work.

What is claimed is:

1. In a steam power electric generating plant having a high pressure steam generator and at least one individual high pressure prime mover unit connected to said generator and a plurality of low pressure prime mover units designed to operate at pressures substantially higher than their normal operating pressure and connected in parallel to the steam discharge end of said high pressure unit, means for compensating the power lost by the breakdown of an individual plant unit, including a normally closed steam by-pass around the high pressure unit dimensioned so that in case of breakdown of the high pressure unit the steam pressure for the low pressure units can be increased through said by-pass sufficiently beyond the normal operating pressure to increase the power output in the low pressure portion of the system sufficiently to compensate for at least the major portion of the loss of power due to the breakdown of a unit.

2. In a steam power electric generating plant having a high pressure steam generator and at least one individual high pressure prime mover unit connected to said generator and a plurality of low pressure prime mover units designed to operate at pressures substantially higher than their normal operating pressure and connected in parallel to the steam discharge end of said high pressure unit, means for compensating the power lost by the breakdown of an individual plant unit, including a normally closed and sufficiently dimensioned steam by-pass around the high pressure unit and a steam generator feed pump prime mover unit having surplus power and being steam connected in parallel with said low pressure units so that, in case of breakdown of a high pressure unit, the steam pressure for the low pressure units can be increased through said by-pass sufficiently above the normal operating pressure of the low pressure units to compensate for the high power unit loss, and in case of a low pressure unit breakdown surplus power can be obtained additionally from said pump unit to compensate for the residual amount of power lacking from the remaining operating high and low pressure units to always deliver substantially the normal power output of the plant.

3. In a steam power electric generating plant having a high pressure steam generator and at least one individual high pressure prime mover unit connected to said generator and a plurality of low pressure prime mover units designed to operate at pressures substantially higher than their normal operating pressure and connected in parallel to the steam discharge end of said high pressure unit, means for compensating the power lost by the breakdown of an individual plant unit, including a normally closed and sufficiently dimensioned steam by-pass around the high pressure unit, and a condensing prime mover unit connected as to steam supply with the output side of the high pressure unit and coupled as to power output with said unit but normally operating at not more than a nominal power output, so that, in case of breakdown of a high pressure unit, the steam pressure for the low pressure units can be increased through said by-pass sufficiently above the normal operating pressure of the low pressure units to compensate for the high pressure unit loss, and in case of a low pressure unit breakdown surplus power can be obtained additionally from said condensing prime mover unit to compensate for the residual amount of power lacking from the remaining high and low pressure units to always deliver substantially the normal power output of the plant.

4. In a steam power electric generating plant having a high pressure steam generator and at least one individual high pressure prime mover unit and a plurality of individual parallel connected low pressure prime mover units designed to operate at pressures substantially higher than their normal operating pressure, the method of compensating the power lost by the breakdown of an individual plant unit, consisting in feeding steam from said steam generator directly to said low pressure units at a pressure sufficiently above the normal operating pressure of said units to increase the power output in the low pressure portion of the system sufficiently to compensate for at least the major portion of the loss of power due to the breakdown of a unit.

HANS GLEICHMANN.